United States Patent
Gong et al.

(10) Patent No.: US 10,824,261 B1
(45) Date of Patent: *Nov. 3, 2020

(54) DISPLAY MODULE, DETECTING METHOD FOR DISPLAY MODULE, AND DISPLAY DEVICE

(71) Applicant: WuHan TianMa Micro-electronics CO., LTD, Wuhan (CN)

(72) Inventors: Houfu Gong, Wuhan (CN); Han Wu, Wuhan (CN); Zhihua Yu, Wuhan (CN)

(73) Assignee: WuHan TianMa Micro-electronics CO., LTD., Wuhan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/729,214

(22) Filed: Dec. 27, 2019

(30) Foreign Application Priority Data

Aug. 28, 2019 (CN) .......................... 2019 1 0801641

(51) Int. Cl.
*G06F 3/041* (2006.01)
*G06F 3/044* (2006.01)

(52) U.S. Cl.
CPC .......... *G06F 3/0412* (2013.01); *G06F 3/0441* (2019.05); *G06F 2203/04102* (2013.01)

(58) Field of Classification Search
CPC .......... G06F 3/041; G06F 3/044; G06F 3/045; G09G 3/00; G09G 3/36; G09G 5/00
See application file for complete search history.

(56) References Cited

U.S. PATENT DOCUMENTS

| 2010/0182275 | A1* | 7/2010 | Saitou | G06F 3/0412 345/174 |
| 2012/0287079 | A1* | 11/2012 | Sato | G06F 3/044 345/174 |
| 2017/0235389 | A1* | 8/2017 | Liu | G06F 3/044 345/174 |
| 2020/0233532 | A1* | 7/2020 | Zuo | G06F 3/0412 |

FOREIGN PATENT DOCUMENTS

| CN | 206311727 U | 7/2017 |
| CN | 107329297 A | 11/2017 |

* cited by examiner

*Primary Examiner* — Pegeman Karimi
(74) *Attorney, Agent, or Firm* — Christensen O'Connor Johnson Kindness PLLC (57) ABSTRACT

Provided is a display module, including: a display panel having a first binding area and a flexible circuit board having a second binding area. First binding pins provided in the first binding area are correspondingly bound to second binding pins provided in the second binding area. First and second test boards are provided in the first and second binding areas, respectively, and the first and second test boards overlap while being insulated from each other. A driving chip fixed to the flexible circuit board includes a touch sensing pin and a touch driving pin. The touch driving pin is configured to output a touch driving signal and the touch sensing pin is configured to receive a touch sensing signal. One of the first test board and the second test board is electrically connected to the touch sensing pin, and the other one is electrically connected to the touch driving pin.

19 Claims, 6 Drawing Sheets

DISPLAY MODULE, DETECTING METHOD FOR DISPLAY MODULE, AND DISPLAY DEVICE

CROSS-REFERENCE TO RELATED APPLICATIONS

The present application claims priority to Chinese Patent Application No. 201910801641.X, filed on Aug. 28, 2019, the content of which is incorporated herein by reference in its entirety.

TECHNICAL FIELD

The present disclosure relates to the field of display technologies, and in particular, to a display module, a detecting method for the display module, and a display device.

BACKGROUND

In the existing display technologies, a display module includes a display panel and a flexible circuit board, and the display panel is connected to the flexible circuit board by means of a binding process. Reliability of the binding connection between the display panel and the flexible circuit board directly affects display performances of the display panel. Therefore, the binding process of the display panel and the flexible circuit board is usually detected in a factory phase. Currently, the binding process is usually detected by manual sampling. Due to strong subjective factors of sampling personnel, over-judgment or misjudgment occurs sometimes, and thus detection thereof has large errors. Further, the manual sampling detection further has problems such as low efficiency and high cost.

SUMMARY

Therefore, embodiments of the present disclosure provide a display module, a detecting method for the display module, and a display device, aiming to solve problems of large error, low efficiency and high cost in the binding process of the display panel and the flexible circuit board.

In an aspect, an embodiment of the present disclosure provides a display module, including: a display panel having a first binding area, a plurality of first binding pins being provided in the first binding area; and a flexible circuit board having a second binding area, a plurality of second binding pins being provided in the second binding area. The plurality of first binding pins is correspondingly bound to the plurality of second binding pins. A first test board is provided in the first binding area, a second test board is provided in the second binding area, and the first test board and the second test board overlap while being insulated from each other. A driving chip is fixed to the flexible circuit board, the driving chip includes pins including a touch sensing pin and a touch driving pin. The touch driving pin is configured to output a touch driving signal and the touch sensing pin is configured to receive a touch sensing signal. One of the first test board and the second test board is electrically connected to the touch sensing pin, and the other one of the first test board and the second test board is electrically connected to the touch driving pin.

In another aspect, an embodiment of the present disclosure provides a display device, including the display module described above.

In still another aspect, an embodiment of the present disclosure provides a detecting method for the display module described above.

BRIEF DESCRIPTION OF DRAWINGS

In order to more clearly illustrate technical solutions in representative embodiments of the present disclosure, the accompanying drawings used in the embodiments are briefly introduced as follows.

DESCRIPTION OF EMBODIMENTS

For better illustrating technical solutions of the present disclosure, representative embodiments of the present disclosure will be described in detail as follows with reference to the accompanying drawings.

It should be noted that, the described embodiments are representative embodiments of the present disclosure, which shall not be interpreted as providing limitations to the present disclosure.

The terms used in the embodiments of the present disclosure are for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

An embodiment of the present disclosure provides a display module. The display module includes a display panel and a flexible circuit board that are bound together in an alignment manner. A set of test boards are provided at positions corresponding to the display panel and the flexible circuit board, i.e., a first test board and a second test board that overlap while being insulated from each other. A state of alignment binding between the display panel and the flexible circuit board can be evaluated by detecting a value of a capacitance between the first test board and the second test board. The present disclosure can achieve a mechanized detection on reliability of the alignment binding process, thereby basically eliminating over-judgment or misjudgment in the manual detection and thus improving the detection efficiency and reducing labor costs.

Figure 1:
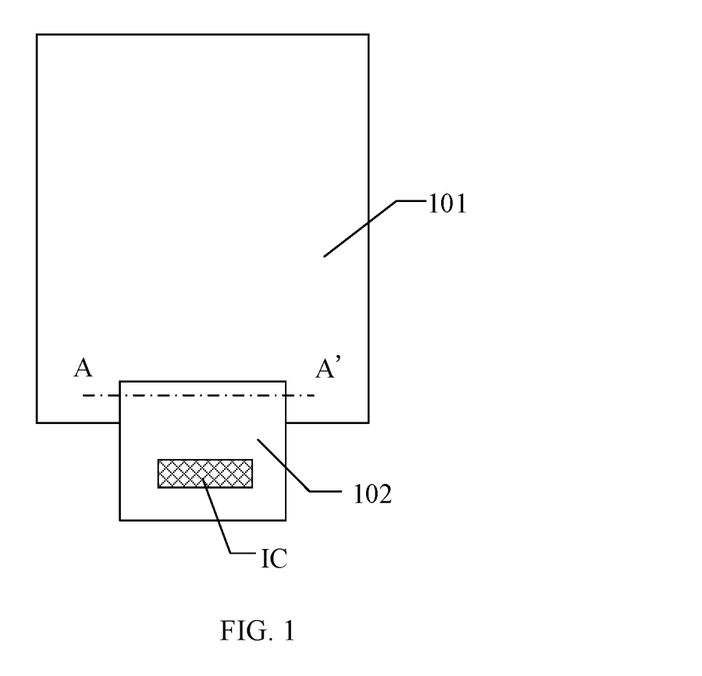
FIG. 1 is a schematic diagram of a display module according to a representative embodiment of the present disclosure.
Figure 2:
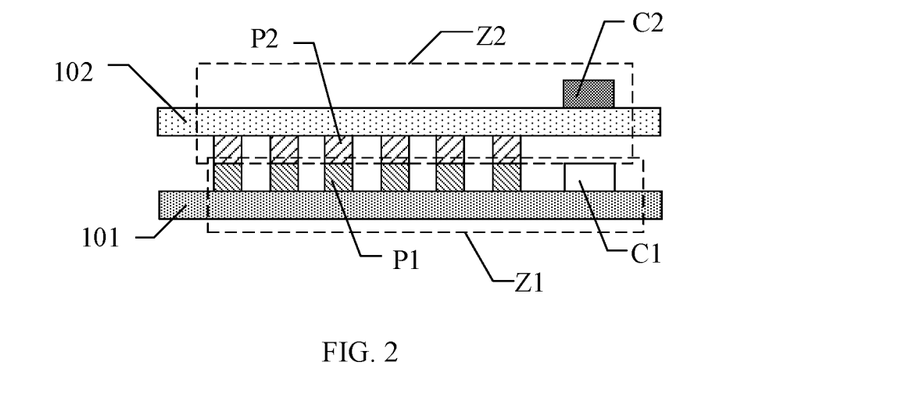
FIG. 2 is a schematic cross-sectional view along AA' of FIG. 1.

FIG. 1 is a schematic diagram of a display module according to an embodiment of the present disclosure. FIG. 2 is a schematic cross-sectional view along AA' of FIG. 1. With reference to FIG. 1 and FIG. 2, a display is provided. The display module includes a display panel 101 and a flexible circuit board 102. The display panel 101 has a first binding area Z1, and a plurality of first binding pins P1 is provided in the first binding area Z1. The flexible circuit board 102 has a second binding area Z2, and a plurality of second binding pins P2 is provided in the second binding area Z2. The first binding pins P1 are correspondingly bound to the second binding pins P2. For example, the first binding pins P1 and the second binding pins P2 are bound together by an anisotropic conductive film. In this embodiment, the display panel 101 may be a liquid crystal display panel or an organic light-emitting display panel. The display panel 101 further includes an array substrate. The first binding area Z1 generally refers to a partial area of the array substrate, that is, the first binding pins P1 are arranged on the array substrate. FIG. 2 is schematic and does not show a specific structure of film layers of the display panel.

As shown in FIG. 2, a first test board C1 is further provided in the first binding area Z1, and a second test board C2 is further provided in the second binding area Z2. The first test board C1 and the second test board C2 overlap while being insulated from each other.

As shown in FIG. 1, a driving chip IC is fixed to the flexible circuit board 102, and the driving chip IC includes pins including a touch sensing pin and a touch driving pin. The touch driving pin is configured to output a touch driving signal, and the touch sensing pin is configured to receive a touch sensing signal. That is, when the touch sensing pin and the touch driving pin are applied in a touch phase, the touch driving pin can output a touch driving signal and the touch sensing pin can receive a touch sensing signal, and the driving chip IC determines a touch position of the display panel based on the sensing signal returned from the touch sensing pin. In order to achieve the touch function, the actual driving chip IC is provided with multiple touch sensing pins and multiple touch driving pins. Specific positions of the touch sensing pins and the touch driving pins of the driving chip IC are not shown in FIG. 1. For the display module provided in this embodiment of the present disclosure, one of the first test board C1 and the second test board C2 is electrically connected to the touch sensing pin, and the other one of the first test board C1 and the second test board C2 is electrically connected to the touch driving pin. In an implementation, the first test board C1 is electrically connected to the touch sensing pin and the second test board C2 is electrically connected to the touch driving pin. In another implementation, the first test board C1 is electrically connected to the touch driving pin and the second test board C2 is electrically connected to the touch sensing pin.

For the display module provided in this embodiment of the present disclosure, after the binding process of the display panel 101 and the flexible circuit board 102, the first test board C1 and the second test board C2 overlap while being insulated from each other. After applying a voltage signal to one of the first test board C1 and the second test board C2, a capacitance will be formed between the first test board C1 and the second test board C2. According to a capacitance calculation formula of $$C = \frac{\varepsilon S}{4\pi k d},$$

where C indicates a capacitance, ε indicates permittivity, S indicates an area in which two capacitance plates face each other, k indicates an electrostatic force constant, and d indicates a perpendicular distance between the two capacitance plates, it is known that an area in which the first test board C1 and the second test board C2 overlap while being insulated from each other (i.e., a facing area) is positively related to the capacitance value. Therefore, the area in which the first test board C1 and the second test board C2 overlap while being insulated from each other can be represented by detecting the capacitance value. When the display panel 101 and the flexible circuit board 102 are bound together in an accurate alignment manner, the area in which the first test board C1 and the second test board C2 overlap while being insulated from each other has a maximum value, and the capacitance has a maximum value; and when the display panel 101 and the flexible circuit board 102 are bound together in an inaccurate alignment manner, the area in which the first test board C1 and the second test board C2 overlap while being insulated from each other is reduced, and the capacitance value is reduced. In this way, according to the detected capacitance value formed between the first test board and the second test board, a state of alignment binding between the display panel and the flexible circuit board can be evaluated to determine whether the binding process is qualified.

Take the first test board C1 being electrically connected to the touch driving pin and the second test board C2 being electrically connected to the touch sensing pin as an example. In this case, during detection of the alignment binding process, under control of the driving chip IC, the touch driving pin can output a touch driving signal to the first test board C1 that is electrically connected thereto. Then a capacitance will be formed between the first test board C1 and the second test board C2, and the touch sensing pin electrically connected to the second test board C2 will return a sensing test signal to the driving chip IC. According to a magnitude of the sensing signal received by the driving chip IC, the capacitance value between first test board C1 and second test board C2 can be determined, so as to determine a state of alignment binding between the display panel and the flexible circuit board. The sensing signal received by the driving chip IC is a digital signal converted from an analog signal. In the factory phase, an alignment offset calculation table for the display panel being bound to the flexible circuit board can be made according to pre-simulation and design, as shown in Table 1 in the following. Data in the Table 1 is related to areas of the first test board and the second test board, and a distance between the first test board and the second test board after the display panel and the flexible circuit board are bound together in an alignment manner. Table 1 is used to illustrate a principle for implementing the technical solution of the present disclosure, and is not intended to limit the present disclosure. In this embodiment of the present disclosure, an offset percentage=(1−an actual overlapping area/the maximum overlapping area).

TABLE 1

Alignment offset calculation table for display panel being bound to flexible circuit board

| offset percentage | capacitance (pF) | magnitude of the sensing signal |
| --- | --- | --- |
| 0 | 0.6 | 9000 |
| 1/3 | 0.4 | 6000 |
| 2/3 | 0.2 | 3000 |
| 1 | 0 | 0 |

Take the offset calculation table given in Table 1 as an example. During detection of the alignment binding process, when the magnitude of the sensing signal received by the driving chip IC is 9000, indicating that the display panel and the flexible circuit board are in accurate alignment, there is no offset and the binding of the display module is qualified. When the magnitude of the sensing signal received by the driving chip IC is 0, indicating that the first test board does not overlap the second test board, the display panel and the flexible circuit board are severely misaligned, the alignment offset percentage is equal to 1, and the display module is not qualified. When the magnitude of the sensing signal received by the driving chip IC is 8000, according to a correspondence relationship between the capacitance and the magnitude of the sensing signal, the capacitance value between the first test board and the second test board is approximately 0.53 pF, and according to a correspondence relationship between the capacitance and the offset percentage, the alignment offset percentage of the display panel and the flexible circuit board is approximately 0.25.

For the display module provided in this embodiment of the present disclosure, during detection of the alignment binding process, a touch driving signal can be outputted through the driving chip to the test board that is electrically connected to the touch driving pin, so that a capacitance is formed between the first and second test boards that overlap while being insulated from each other. The driving chip receives the sensing signal returned from the test board that is electrically connected to the touch sensing pin. The sensing signal can represent the capacitance value between the first test board and the second test board, and the state of the alignment binding between the display panel and the flexible circuit board then can be evaluated. The present disclosure can achieve a mechanized detection on reliability of the alignment binding process, thereby basically eliminating a situation of over-judgment or misjudgment in the manual detection and thus improving the detection efficiency and reducing labor costs.

In addition, the detection of the alignment binding process of the display module provided in this embodiment of the present disclosure may be completed in a touch function test process. When performing the touch function test, the driving chip sends a touch driving signal to a touch driving electrode through the touch driving pin, and then the sensing signal returned from the touch sensing electrode is received by the touch sensing pin. The driving chip determines whether there is a touch on the display panel and a touch position thereof through the magnitude of the sensing signal, so as to verify whether the touch function of the display module is reliable. When performing the touch function test, the driving chip simultaneously sends a touch driving signal to the test board electrically connected to the touch driving pin through the touch driving pin, and then the driving chip receives the sensing signal returned from the test board electrically connected to the touch sensing pin through the touch sensing pin. In this way, the detection of the alignment binding process can be performed during the touch function test, thereby saving a detection process. Moreover, for a display module with a touch function, in order to achieve a required yield of the outgoing products, each outgoing display module should be detected for the touch function. Therefore, for the display module provided by this embodiment of the present disclosure, a complete detection of the binding process can be achieved thereby improving the yield of the products.

Furthermore, when manufacturing the display module provided in this embodiment of the present disclosure, after detection of the alignment binding process of multiple display modules, pre-simulation data and design data are combined to determine a preset threshold. During detection, when the sensing signal received by the driving chip meets the preset threshold, this indicates that the alignment binding process meets the requirement and the product is qualified. During detection, when the sensing signal received by the driving chip does not meet the preset threshold, this indicates that the alignment binding process does not meet the requirement. Then, the offset percentage is looked up or calculated in the corresponding Table 1 based on the detected sensing signal, and then a process parameter of the alignment binding is appropriately adjusted based on the correspondence relationship between the offset percentage and an offset, in such a manner that the offset is converted into data quantization monitoring, thereby controlling the alignment binding process.

Figure 3:
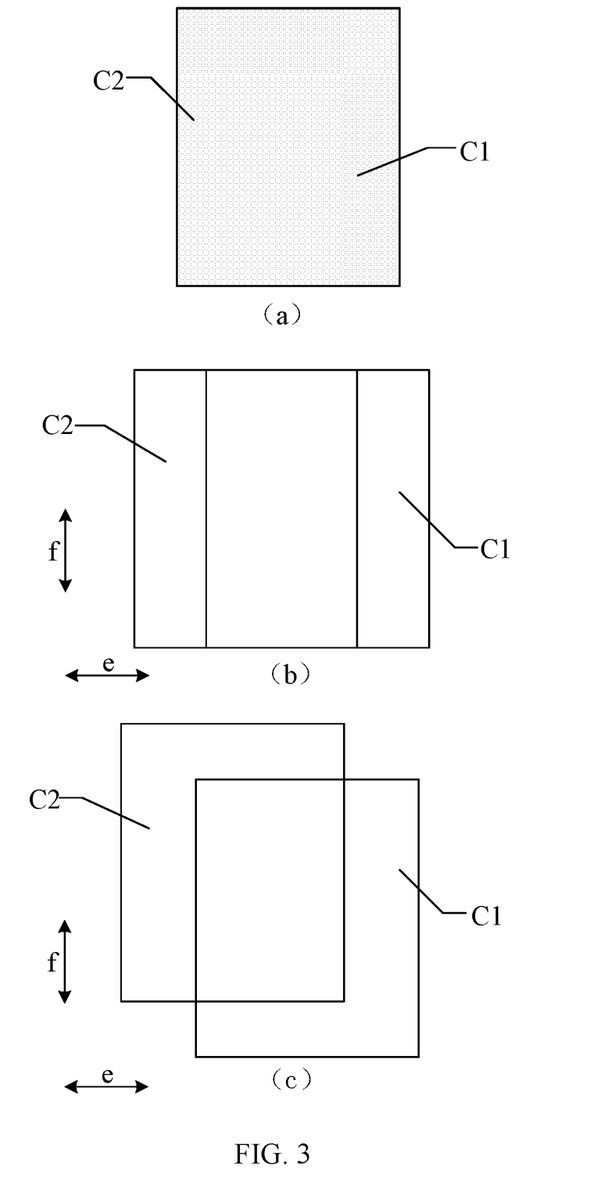
FIG. 3 is a schematic diagram of an example of overlapping a first test board and a second test board in a display module according to a representative embodiment of the present disclosure.

An example of calculating the offset according to the offset percentage will be described as follows. FIG. 3 is a schematic diagram of an example of overlapping a first test board and a second test board in a display module according to an embodiment of the present disclosure. In an example, the first test board and the second test board have a same shape and a same area. As shown in FIG. 3, in an example (a), the first test board C1 and the second test board C2 completely overlap, indicating that there is no alignment offset. In an example (b), the first test board C1 and the second test board C2 partially overlap, and there is a certain alignment offset in a direction e. For example, the offset percentage is 1/3 according to the detection result and the data in Table 1 described above, and a width of the first test board C1 and a width of the second test board C2 each are L, then the alignment offset is L/3 in the direction e. In an example (c), the first test board C1 and the second test board C2 partially overlap, and there is a certain alignment offset both in the direction e and in a direction f. In this case, the offset percentage can also be obtained according to the detection result and the data in Table 1 described above. For an actual product, the area of the first test board may not be identical with the area of the second test board. In such case, the offset percentage for the maximum overlapping area between the first test board and the second test board is 0, and the offset percentage is 1 when the area where the overlapping area between the first test board and the second test board is 0.

In some optional implementations, the smaller one of the first test board and the second test board has an area S, and a size of an area in which the first test board and the second test board overlap and while being insulated from each other is S1, where ⅔≤S1/S≤1. S1/S indicates an overlapping area percentage of the first test board and the second test board. The larger overlapping area percentage means that the display panel and the flexible circuit board are in the more accurate alignment binding. Moreover, the larger overlapping area percentage means that the capacitance between the first test board and the second test board is larger. In this case, when performing detection of the alignment binding process, if the sensing signal received by driving chip has the larger magnitude, the alignment detection is more accurate. In this embodiment, the overlapping area percentage of the first test board and the second test board is at least ⅔, so that the alignment binding of the display panel and the flexible circuit board is of high accuracy and the alignment binding process is reliable, thereby ensuring stable product performance.

Figure 4:
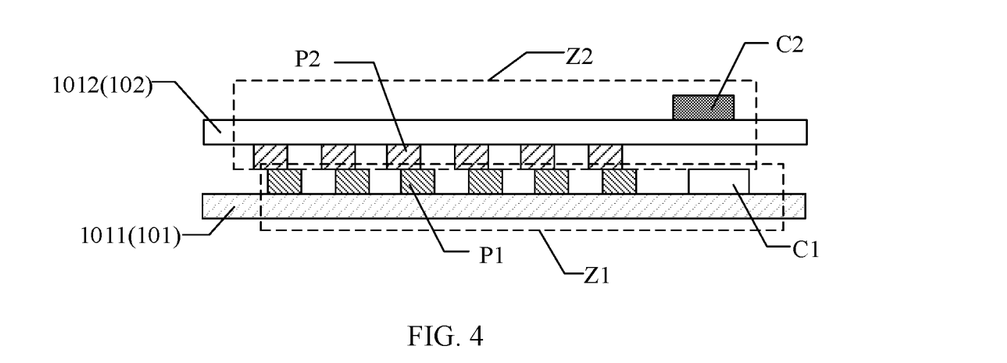
FIG. 4 is a schematic diagram of an implementation of a display module according to a representative embodiment of the present disclosure.

FIG. 4 is a schematic diagram of an implementation of a display module according to an embodiment of the present disclosure. In an embodiment, as shown in FIG. 4, a plurality of first binding pins P1 is arranged along a first direction x, and a plurality of second binding pins P2 is arranged along the first direction x. The display panel 101 includes a first substrate 1011, and the first substrate 1011 may be an array substrate. The first test board C1 and the first binding pins P1 are located at a same side of the first substrate 1011. The flexible circuit board 102 includes a second substrate 1021. The flexible circuit board 102 includes a metal wiring layer and an insulation layer. The second substrate 1021 may be an insulation layer. The second test board C2 is located at a side of the second substrate 1021 facing away from the second binding pins P2. In this embodiment, the first test board and the first binding pins are located at a same side of the first substrate. When manufacturing, the first test board can reuse a manufacturing process of the first binding pin, thereby simplifying a process thereof. Moreover, the second test board and the second binding pins are located at different sides of the second substrate, so that the first test board and the second test board overlap while being insulated from each other, thereby preventing the second test board and the second binding pin from being arranged at a same side of the second substrate, which would otherwise cause a contact between the first test board and the second test board to form a short circuit.

For the display module provided by this embodiment of the present disclosure, there may be various positional relationships between the first binding pin and the first test board and various positional relationships between the second binding pin and the second test board, which can be designed according to design requirements in practical applications.

Figure 5:
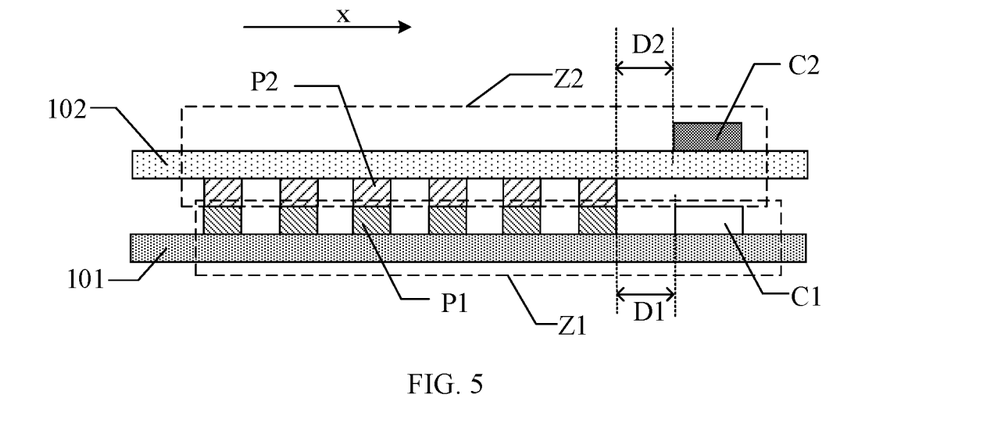
FIG. 5 is a schematic diagram of another implementation of a display module according to a representative embodiment of the present disclosure.

FIG. 5 is a schematic diagram of another implementation of a display module according to an embodiment of the present disclosure. In an embodiment, as shown in FIG. 5, a plurality of first binding pins P1 is arranged along the first direction x and a plurality of second binding pins P2 is arranged along the first direction x. In the first direction x, a distance between the first test board C1 and a first binding pin P1 adjacent thereto is referred as a first distance D1, a distance between the second test board C2 and a second binding pin P2 adjacent thereto is referred as a second distance D2, and the first distance D1 is equal to the second distance D2. In this embodiment, in the first direction x, a width of the first test board C1 and a width of the second test board C2 may be equal to or different from each other.

Figure 6:
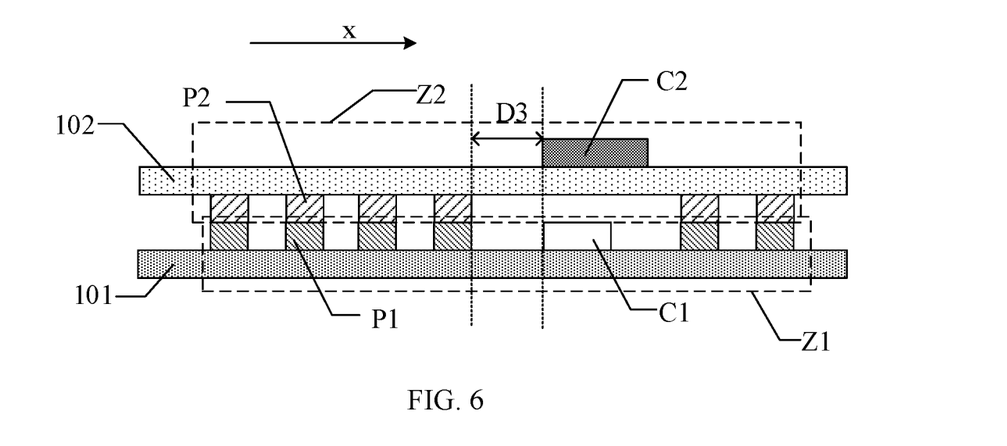
FIG. 6 is a schematic diagram of another implementation of a display module according to a representative embodiment of the present disclosure.

FIG. 6 is a schematic diagram of another implementation of a display module according to an embodiment of the present disclosure. In this embodiment, as shown in FIG. 6, in the first direction x, the first test board C1 is located between two adjacent first binding pins P1, the second test board C2 is located between two adjacent second binding pins P2, and each of respective distances from the first test board C1 and the second test board C2 to an adjacent first binding pin P1 and an adjacent second binding pin P2 that are located at a same side is D3. The first test board C1 and the second test board C2 have different widths in the first direction x. A distance between the first test board C1 and another first binding pin P1 on the other side is not equal to a distance between the second test board C2 and another second binding pin P2 on the other side.

In another embodiment, in the first direction, the first test board is located between two adjacent first binding pins, the second test board is located between two adjacent second binding pins, and the first test board and the second test board have different widths in the first direction. The respective distances from the first test board and the second test board to the adjacent first binding pin and the adjacent second binding pin that are located at same side are equal to each other.

In an embodiment, the driving chip in the display module provided by the present disclosure is a touch driving chip, and the display driving chip for driving the display module to perform display may be separately bound to the display panel.

In another embodiment, the driving chip in the display module provided by the present disclosure is a touch and display integrated chip.

Figure 7:
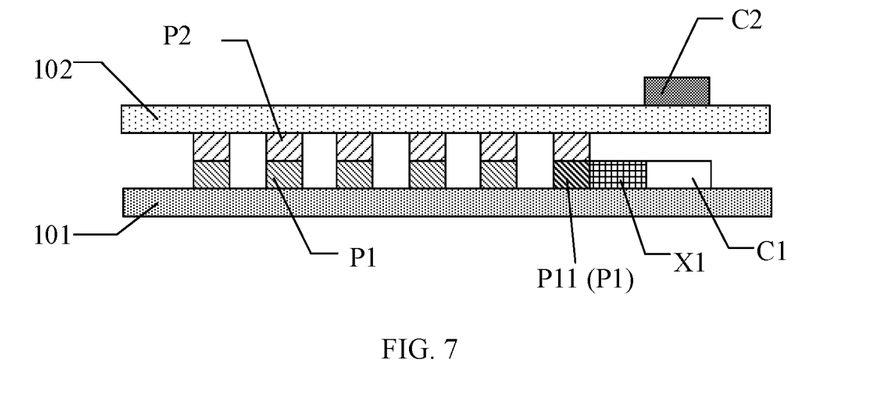
FIG. 7 is a schematic diagram of an implementation of a display module according to a representative embodiment of the present disclosure.

FIG. 7 is a schematic diagram of an implementation of a display module according to an embodiment of the present disclosure. In this embodiment, as shown in FIG. 7, the first binding pins P1 include a first binding sub-pin P11, the display panel 101 includes a first wire X1, and the first test board C1 is electrically connected to the first binding sub-pin P11 through the first wire X1. The first sub-binding pin P11 is connected to the driving chip IC through the second binding pin P2 electrically connected to the first sub-binding pin P11. In order to detect the alignment process using the first test board and the second test board, it is necessary to design an electrical connection between the first test board on the display panel and a pin of the driving chip on the flexible circuit board. This implementation can be achieved by means of one first binding sub-pin, and then one first wire on the display panel is additionally required (e.g., only one first wire), thereby making the design simple and easy to achieve. For example, in this implementation, the first binding pin closest to the first test board may be designed as the first binding sub-pin. The first wire does not need to be wound during manufacturing. The first wire has the shortest length and occupies the smallest area, thereby facilitating saving space in the first binding area. In this embodiment, a layer where the first wire is located is not limited. As an example, the first wire may be made of the same material in the same layer as the first binding sub-pin and the first test board. As another example, the first wire may be located in a different layer from the first sub-binding pin and the first test board. In this case, the first wire may be respectively electrically connected to the first binding sub-pin and the first test board via a through hole in the insulation layer.

Figure 8:
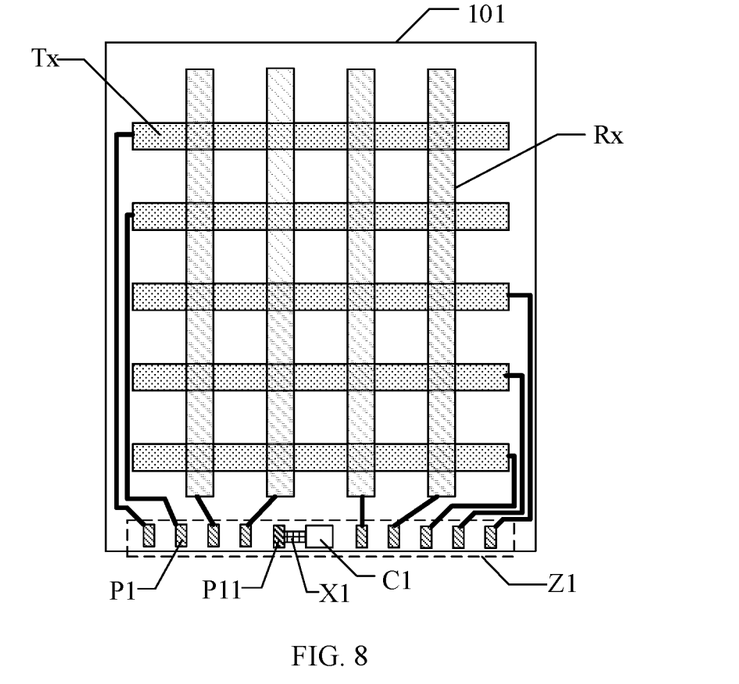
FIG. 8 is a schematic diagram of another implementation of a display module according to a representative embodiment of the present disclosure.

FIG. 8 is a schematic diagram of another implementation of a display module according to an embodiment of the present disclosure. In this embodiment, as shown in FIG. 8, the display panel 101 and a part of the first binding pins P1 and the first test board C1 on the display panel are illustrated. Positions of the first binding sub-pin P11 and the first test board C1 in the first binding area Z1 shown in the figure are illustrative and are not intended to limit the present disclosure. The display panel 101 includes a plurality of touch driving electrodes Tx and a plurality of touch sensing electrodes Rx. The first binding sub-pin P11 is neither connected to the touch driving electrode Tx, nor electrically connected to the touch sensing electrode Rx.

As an example, in the embodiment shown in FIG. 8, the second binding pin P2 bound to the first binding sub-pin P11 is electrically connected to the touch driving pin, and the second test board C2 is electrically connected to the touch sensing pin. The first binding sub-pin P11 is not connected to the touch driving electrodes Tx, that is, the touch driving pin electrically connected to the first test board C1 does not output a touch driving signal to the touch driving electrode Tx in the display panel during the touch phase. In this embodiment, when manufacturing the driving chip, in addition to the pins (including the touch driving pin and the touch sensing pin) required for achieving the touch function, a touch driving pin electrically connected to the first test board and a touch sensing pin electrically connected to the second test board are additionally provided. During detection of the alignment binding process, the driving chip outputs a touch driving signal to the touch driving pin electrically connected to the first test board, and at the same time, the driving chip receives a sensing signal returned from the touch sensing pin electrically connected to the second test board. The sensing signal can represent a capacitance value between the first test board and the second test board, and the alignment binding between the display panel and the flexible circuit board then can be evaluated through the sensing signal.

Figure 9:
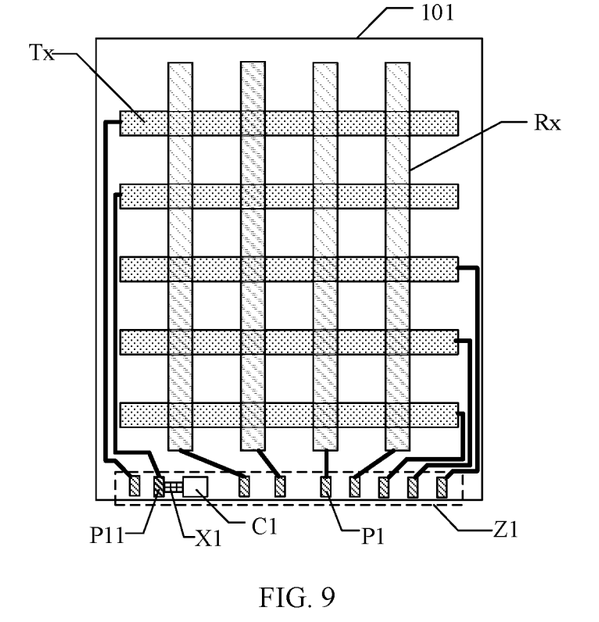
FIG. 9 is a schematic diagram of another implementation of a display module according to a representative embodiment of the present disclosure.

FIG. 9 is a schematic diagram of another implementation of a display module according to an embodiment of the present disclosure. In this embodiment, as shown in FIG. 9, the display panel 101 and a part of the first binding pins P1 and the first test board C1 on the display panel are illustrated. The display panel 101 includes a plurality of touch driving electrodes Tx and a plurality of touch sensing electrodes Rx, and the first binding sub-pin P11 is electrically connected to the touch driving electrode Tx. In this embodiment, the second binding pin P2 bound to the first binding sub-pin P11 is electrically connected to the touch driving pin, and the second test board C2 is electrically connected to the touch sensing pin. In this embodiment, the first binding sub-pin P11 is electrically connected to the first test board C1, and the first binding sub-pin P11 is electrically connected to the touch driving electrode Tx. During detection of the alignment binding process, the driving chip provides a touch driving signal to the first test board C1 through the first binding sub-pin P11, so that a capacitance is formed between the first test board and the second test board, and then the driving chip receives a sensing signal returned from the second test board. In this way, the capacitance between the first test board and the second test board can be detected, and then the alignment binding between the display panel and the flexible circuit board can be evaluated. In the touch phase, the driving chip provides a touch driving signal to the touch driving electrode electrically connected thereto through the first binding sub-pin P11, and the driving chip receives a sensing signal returned from the touch sensing electrode for detecting touch function, so the first binding sub-pin P11 transmits the touch driving signal to the touch driving electrode and the first test board at the same time, without affecting the sensing signal on the touch sensing electrode. This design does not affect accuracy of the touch function. This embodiment is equivalent to that the first test board and the touch driving electrode share one first binding pin (that is, the first binding sub-pin), which can reduce the number of binding pins arranged in the first binding area and thus save space in the first binding area. Moreover, the number of touch driving pins on the driving chip can also be reduced accordingly, thereby simplifying a design of the driving chip.

In an embodiment, the second binding pin P2 bound to the first binding sub-pin P11 is electrically connected to the touch sensing pin, and the second test board C2 is electrically connected to the touch driving pin. As shown in FIG. 8, the display panel includes a plurality of touch driving electrodes Tx and a plurality of touch sensing electrodes Rx, and the first binding sub-pin P11 is not electrically connected to the touch sensing electrode Rx. In this embodiment, during detection of the alignment binding, the driving chip provides a touch driving signal to the second test board and receives a sensing signal returned from the first test board to detect the capacitance between the first test board and the second test board, thereby achieving detection of the alignment binding process. A first binding sub-board electrically connected to the first test board is not electrically connected to the touch sensing electrode in the display panel, which prevents the first binding sub-board from returning the sensing signal on the touch sensing electrode and the sensing signal on the first test board to the driving signal during the touch phase, which would otherwise result in that the driving chip could not accurately identify the sensing signal on the touch sensing electrode and thus affect reliability of the touch function. In this implementation, in addition to the pins (including the touch driving pin and the touch sensing pin) on the driving chip required for achieving the touch function, a touch sensing pin electrically connected to the first test board and a touch driving pin electrically connected to the second test board are additionally provided, so as to achieve detection of the alignment binding process while achieving reliability of the performance of the touch function of the display module.

Figure 10:
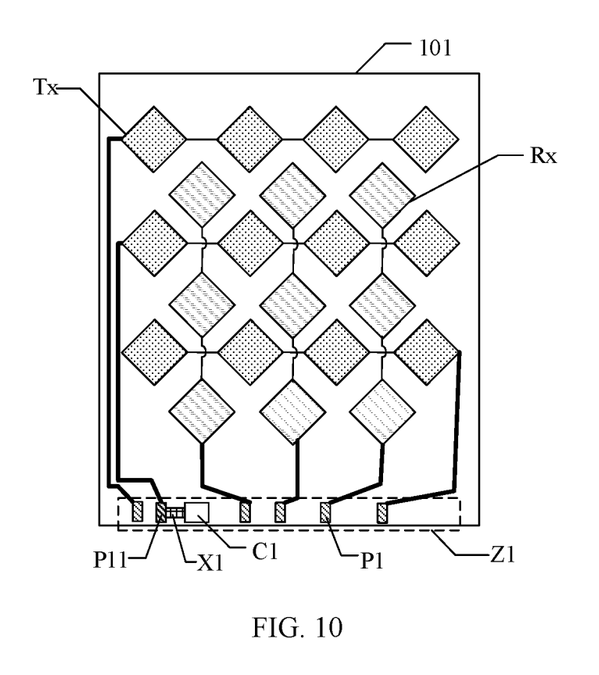
FIG. 10 is a schematic diagram of an implementation of a display module according to a representative embodiment of the present disclosure.

The touch driving electrode Tx and the touch sensing electrode Rx illustrated in FIG. 8 and FIG. 9 are both strip-shaped electrodes. For example, the touch electrode may also be a block-shaped electrode. FIG. 10 is a schematic diagram of an implementation of a display module according to an embodiment of the present disclosure. As shown in FIG. 10, the display panel 101 includes a plurality of touch driving electrodes Tx and a plurality of touch sensing electrodes Rx. The touch driving electrodes Tx are arranged in rows, and the touch sensing electrodes Rx are arranged in columns. It is shown that the first binding sub-pin P11 electrically connected to the first test board C1 is electrically connected to the touch driving electrode Tx.

In another implementation, the display panel includes the touch sensing electrode and the touch driving electrode as shown in FIG. 10, and the first binding sub-pin electrically connected to the first test board is neither electrically connected to the touch driving electrode nor electrically connected to the touch sensing electrode.

Figure 11:
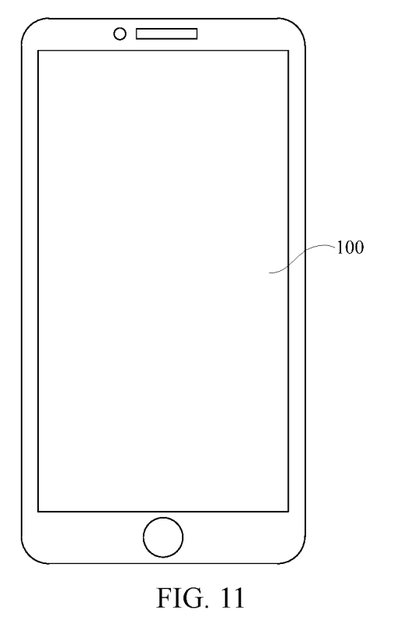
FIG. 11 is a schematic diagram of a display device according to a representative embodiment of the present disclosure.

Based on the same inventive concept, the present disclosure further provides a display device. FIG. 11 is a schematic diagram of a display device according to an embodiment of the present disclosure. As shown in FIG. 11, the display device includes the display module 100 provided by any embodiment of the present disclosure. A specific structure of the display module 100 has been described in detail in the above embodiments, and will not be repeated herein. It should be noted that the display device shown in FIG. 11 is illustrative, and the display device can be any electronic device having a display function, such as a mobile phone, a tablet computer, a notebook computer, an electronic paper book, or a television.

Figure 12:
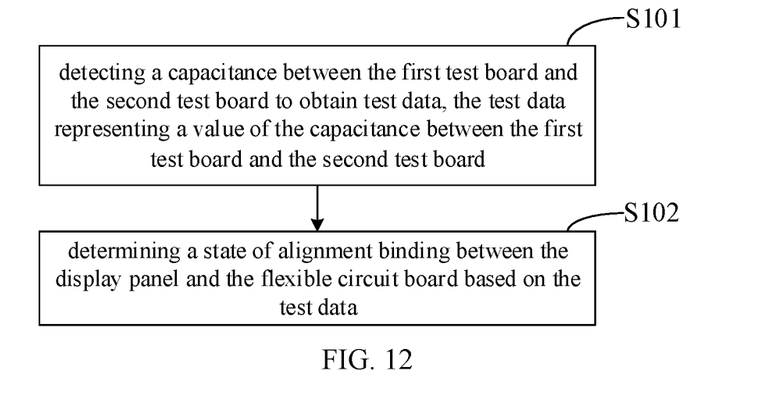
FIG. 12 is a flowchart of a detecting method for a display module according to a representative embodiment of the present disclosure.

Based on the same inventive concept, the present disclosure further provides a detecting method for the display module provided by any embodiment of the present disclosure. FIG. 12 is a flowchart of a detecting method for a display module according to an embodiment of the present disclosure. As shown in FIG. 12, the method includes following steps.

At a step S101, a capacitance between the first test board and the second test board is detected to obtain test data, and the test data represents a value of the capacitance between the first test board and the second test board. With reference to the embodiment of the display module corresponding to FIG. 2 described above, the display module 101 and the flexible circuit board 102 in the display module are bound together in an alignment manner through the first binding pins P1 and the second binding pins P2. In an example, the first test board C1 is electrically connected to the touch driving pin, and the second test board C2 is electrically connected to the touch sensing pin. In this case, under control of the driving chip IC, the touch driving pin can output a touch driving signal to the first test board C1 electrically connected thereto. Then, a capacitance will be formed between the first test board C1 and the second test board C2, and the touch sensing pin electrically connected to the second test board C2 will return a sensing test signal to the driving chip IC. According to a magnitude of the sensing signal received by the driving chip IC, a value of the capacitance between first test board C1 and second test board C2 can be determined. The sensing signal received by the driving chip is a test data, and the test data is a digital signal converted from an analog signal.

At a step S102, a state of alignment binding between the display panel and the flexible circuit board is determined based on the test data.

According to a capacitance calculation formula $$C = \frac{\varepsilon S}{4\pi kd},$$

where C indicates a capacitance, ε indicates permittivity, S indicates an area in which two capacitance plates face each other, k indicates an electrostatic force constant, and d indicates a perpendicular distance between the two capacitance plates, it is known that an area in which the first test board C1 and the second test board C2 overlap while being insulated from each other (that is, a facing area) is positively related to the value of the capacitance. Therefore, a size of the area in which the first test board C1 and the second test board C2 overlap while being insulated from each other can be reflected by detecting the value of the capacitance. When the display panel 101 and the flexible circuit board 102 are bound together in an accurate alignment manner, the area in which the first test board C1 and the second test board C2 overlap while being insulated from each other has a maximum size, and the capacitance has a maximum value; when the display panel 101 and the flexible circuit board 102 are bound together in an inaccurate alignment manner, the area in which the first test board C1 and the second test board C2 overlap while being insulated from each other is reduced, and the capacitance value is reduced. In this way, according to the detected value of the capacitance formed between the first test board and the second test board, that is, according to the test data representing the value of the capacitance obtained in the step S101, a state of alignment binding between the display panel and the flexible circuit board can be evaluated to determine whether the binding process is qualified.

For the detecting method for the display module provided in this embodiment of the present disclosure, the state of the alignment binding between the display panel and the flexible circuit board can be evaluated by detecting the value of the capacitance between the first test board and the second test board. The present disclosure can achieve a mechanized detection on reliability of the alignment binding process, thereby basically eliminating a situation of over-judgment or misjudgment in the manual detection and thus improving the detection efficiency and reducing labor costs.

Further, the display module has a touch function. In an embodiment, the detecting method for the display module includes: detecting the capacitance between the first test board and the second test board during a touch function test process of the display module. For a display module with a touch function, in order to achieve a required yield of the outgoing products, detection on the touch function has to be performed on each outgoing display module. Therefore, for the display module provided by this embodiment of the present disclosure, a complete detection of the binding process can be achieved, thereby improving the yield of the products.

Further, at step S102, determining the state of the alignment binding between the display panel and the flexible circuit board based on the test data includes: comparing the test data with a preset threshold; determining that a state of alignment binding between the display panel and the flexible circuit board is qualified when the test data is larger than or equal to the preset threshold; and determining that the state of alignment binding between the display panel and the flexible circuit board is unqualified when the test data is smaller than the preset threshold. In this implementation, after detection of the alignment binding processes of multiple display modules, pre-simulation data and design data are combined to determine a preset threshold. During detection, when the sensing signal received by the driving chip meets the preset threshold (i.e., the test data is larger than or equal to the preset threshold), this indicates that the alignment binding process meets the requirement and the product is qualified. During detection, when the sensing signal received by the driving chip does not meet the preset threshold (i.e., the test data is smaller than the preset threshold), this indicates that the alignment binding process does not meet the requirement. In this way, the alignment binding process can be monitored by quantized data.

In an embodiment, the detecting method for the display module further includes: calculating a test offset of the alignment binding between the display panel and the flexible circuit board based on the test data when the test data is smaller than the preset threshold; adjusting an alignment process parameter of the display panel and the flexible circuit board based on the test offset. When the test data is smaller than the preset threshold, an offset percentage is looked up or calculated in a corresponding Table 1 based on the detected tested data, and then a process parameter of the alignment binding is appropriately adjusted based on a correspondence relationship between the offset percentage and the offset, in such a manner that the offset is converted into data quantization monitoring, thereby controlling the alignment binding process.

The above-described embodiments are representative embodiments of the present disclosure and are not intended to limit the present disclosure. Any modifications, equivalent substitutions and improvements made within the principle of the present disclosure shall fall into the protection scope of the present disclosure.

What is claimed is:

1. A display module, comprising:
a display panel having a first binding area, a plurality of first binding pins being provided in the first binding area; and
a flexible circuit board having a second binding area, a plurality of second binding pins being provided in the second binding area,
wherein
the plurality of first binding pins is correspondingly bound to the plurality of second binding pins;
a first test board is provided in the first binding area, a second test board is provided in the second binding area, and the first test board and the second test board overlap while being insulated from each other;
a driving chip is fixed to the flexible circuit board, the driving chip comprises pins comprising a touch sensing pin and a touch driving pin, wherein the touch driving pin is configured to output a touch driving signal and the touch sensing pin is configured to receive a touch sensing signal; and
one of the first test board and the second test board is electrically connected to the touch sensing pin, and the other one of the first test board and the second test board is electrically connected to the touch driving pin.

2. The display module according to claim 1, wherein a smaller one of the first test board and the second test board has an area S, and a size of an area in which the first test board and the second test board overlap while being insulated from each other is S1, where $2/3 \leq S1/S \leq 1$.

3. The display module according to claim 2, wherein the plurality of first binding pins comprises a first binding sub-pin, the display panel comprises a first wire, and the first test board is electrically connected to the first binding sub-pin through the first wire.

4. The display module according to claim 3, wherein
one of the plurality of second binding pins that is connected to the first binding sub-pin is electrically connected to the touch driving pin; and
the second test board is electrically connected to the touch sensing pin.

5. The display module according to claim 4, wherein
the display panel further comprises a plurality of touch driving electrodes; and
the first binding sub-pin is electrically connected to the plurality of touch driving electrodes.

6. The display module according to claim 3, wherein
one of the plurality of second binding pins that is connected to the first binding sub-pin is electrically connected to the touch sensing pin; and the second test board is electrically connected to the touch driving pin; and the display panel further comprises a plurality of touch sensing electrodes, and the first binding sub-pin is not electrically connected to the plurality of touch sensing electrodes.

7. The display module according to claim 1, wherein
the display panel comprises a first substrate, and the first test board and the plurality of first binding pins are located at a same side of the first substrate; and
the flexible circuit board comprises a second substrate, and the second test board is located at a side of the second substrate facing away from the plurality of second binding pins.

8. The display module according to claim 1, wherein the driving chip is a touch driving chip.

9. The display module according to claim 8, wherein the driving chip is a touch and display integrated chip.

10. The display module according to claim 1, wherein the plurality of first binding pins comprises a first binding sub-pin, the display panel comprises a first wire, and the first test board is electrically connected to the first binding sub-pin through the first wire.

11. The display module according to claim 10, wherein
one of the plurality of second binding pins that is connected to the first binding sub-pin is electrically connected to the touch driving pin; and
the second test board is electrically connected to the touch sensing pin.

12. The display module according to claim 11, wherein
the display panel further comprises a plurality of touch driving electrodes; and
the first binding sub-pin is electrically connected to the plurality of touch driving electrodes.

13. The display module according to claim 10, wherein
one of the plurality of second binding pins that is connected to the first binding sub-pin is electrically connected to the touch sensing pin; and the second test board is electrically connected to the touch driving pin; and
the display panel further comprises a plurality of touch sensing electrodes, and the first binding sub-pin is not electrically connected to the plurality of touch sensing electrodes.

14. A display device, comprising a display module, the display module comprising:
a display panel having a first binding area, a plurality of first binding pins being provided in the first binding area; and
a flexible circuit board having a second binding area, a plurality of second binding pins being provided in the second binding area,
wherein
the plurality of first binding pins is correspondingly bound to the plurality of second binding pins;
a first test board is provided in the first binding area, a second test board is provided in the second binding area, and the first test board and the second test board overlap while being insulated from each other;
a driving chip is fixed to the flexible circuit board, the driving chip comprises pins comprising a touch sensing pin and a touch driving pin, wherein the touch driving pin is configured to output a touch driving signal and the touch sensing pin is configured to receive a touch sensing signal; and
one of the first test board and the second test board is electrically connected to the touch sensing pin, and the other one of the first test board and the second test board is electrically connected to the touch driving pin.

15. A detecting method for a display module, the display module comprising a display panel having a first binding area, a plurality of first binding pins being provided in the first binding area; and a flexible circuit board having a second binding area, a plurality of second binding pins being provided in the second binding area, wherein the plurality of first binding pins is correspondingly bound to the plurality of second binding pins; wherein a first test board is provided in the first binding area, a second test board is provided in the second binding area, and the first test board and the second test board overlap while being insulated from each other; wherein a driving chip is fixed to the flexible circuit board, and the driving chip comprises pins comprising a touch sensing pin and a touch driving pin, wherein the touch driving pin is configured to output a touch driving signal and the touch sensing pin is configured to receive a touch sensing signal; and wherein one of the first test board and the second test board is electrically connected to the touch sensing pin, and the other one of the first test board and the second test board is electrically connected to the touch driving pin, the detecting method comprising:

detecting a capacitance between the first test board and the second test board to obtain test data, the test data representing a value of the capacitance between the first test board and the second test board; and     determining a state of alignment binding between the display panel and the flexible circuit board based on the test data.

16. The detecting method according to claim 15, wherein a smaller one of the first test board and the second test board has an area S, and a size of an area in which the first test board and the second test board overlap while being insulated from each other is S1, where $2/3 \leq S1/S \leq 1$.

17. The detecting method according to claim 15, wherein the display module has a touch function, and the method further comprises detecting the touch function of the display module at the same time of said detecting the capacitance between the first test board and the second test board.

18. The detecting method according to claim 15, wherein said determining the state of the alignment binding between the display panel and the flexible circuit board based on the test data comprises:

comparing the test data with a preset threshold; and determining that the alignment binding between the display panel and the flexible circuit board is qualified when the test data is larger than or equal to the preset threshold; or determining that the alignment binding between the display panel and the flexible circuit board is unqualified when the test data is smaller than the preset threshold.

19. The detecting method according to claim 18, further comprising:

calculating a test offset of the alignment binding between of the display panel and the flexible circuit board based on the test data when the test data is smaller than the preset threshold; and     adjusting an alignment process parameter of the display panel and the flexible circuit board based on the test offset.

\* \* \* \* \*